(12) United States Patent
Tanaka et al.

(10) Patent No.: US 11,385,457 B2
(45) Date of Patent: Jul. 12, 2022

(54) OPTICAL SCANNING DEVICE HAVING ROTATING POLYGON MIRROR, AND IMAGE FORMING APPARATUS INCLUDING THE SAME

(71) Applicant: CANON KABUSHIKI KAISHA, Tokyo (JP)

(72) Inventors: Yoshihiko Tanaka, Mishima (JP); Hisanori Kobayashi, Kawasaki (JP); Naoki Matsushita, Suntou-gun (JP); Takatoshi Tanaka, Atami (JP); Mitsuhiro Ohta, Yokohama (JP); Hiroki Katayama, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/016,175

(22) Filed: Sep. 9, 2020

(65) Prior Publication Data
US 2021/0080712 A1 Mar. 18, 2021

(30) Foreign Application Priority Data

Sep. 13, 2019 (JP) .............................. JP2019-166871

(51) Int. Cl.
*G02B 26/12* (2006.01)
*G03G 15/28* (2006.01)
(Continued)

(52) U.S. Cl.
CPC ............ *G02B 26/122* (2013.01); *B41J 2/471* (2013.01); *G02B 26/10* (2013.01); *G02B 26/12* (2013.01);
(Continued)

(58) Field of Classification Search
CPC ... H04N 1/113; B41J 2/471; G03G 15/04036; G03G 2215/0404; G03G 15/0409;
(Continued)

(56) References Cited

U.S. PATENT DOCUMENTS

2012/0251158 A1* 10/2012 Ishidate ........... G03G 15/04045
399/98
2015/0370065 A1* 12/2015 Ozawa ................... G02B 26/10
347/118
(Continued)

FOREIGN PATENT DOCUMENTS

EP 2680056 A1 * 1/2014 ............. G02B 7/008
JP 05297305 A * 11/1993
(Continued)

OTHER PUBLICATIONS

Tomita (JPH09211369A) English Translation Aug. 15, 1997 (Year: 1997).*

*Primary Examiner* — Ryan D Walsh
(74) *Attorney, Agent, or Firm* — Canon U.S.A., Inc. IP Division

(57) ABSTRACT

In an optical scanning device, an outer wall closest to a circumscribed circle of a rotating polygon mirror has a space in a position facing to a position of a reflection surface of the rotating polygon mirror in an axial direction of a rotating shaft. A part of a cover is provided in a position farther from the circumscribed circle than the outer wall so as to close the space, when the optical scanning device is viewed in a direction perpendicular to the axial direction of the rotating shaft.

13 Claims, 11 Drawing Sheets

(51) Int. Cl.
G03G 15/04 (2006.01)
G03G 21/16 (2006.01)
G02B 26/10 (2006.01)
B41J 2/47 (2006.01)
H04N 1/113 (2006.01)

(52) U.S. Cl.
CPC ....... G02B 26/127 (2013.01); G03G 15/0409 (2013.01); G03G 15/04036 (2013.01); G03G 15/04045 (2013.01); G03G 15/04072 (2013.01); G03G 15/28 (2013.01); G03G 21/1666 (2013.01); H04N 1/113 (2013.01); G03G 2215/00177 (2013.01); G03G 2215/0404 (2013.01)

(58) Field of Classification Search
CPC ........ G03G 21/1666; G03G 15/04072; G03G 15/04045; G03G 15/28; G03G 2215/00177; G02B 26/10; G02B 26/12; G02B 26/122; G02B 26/127
See application file for complete search history.

(56) References Cited

U.S. PATENT DOCUMENTS

2016/0246207 A1* 8/2016 Iwai ..................... G03G 15/043
2019/0354036 A1* 11/2019 Sato ...................... G02B 26/12

FOREIGN PATENT DOCUMENTS

| JP | 6-331922 A | | 12/1994 | |
|---|---|---|---|---|
| JP | 9-211369 A | | 8/1997 | |
| JP | 2005024894 A | * | 1/2005 | .............. B41J 2/473 |
| JP | 2006349925 A | * | 12/2006 | ........... H04N 1/1135 |
| JP | 2015135418 A | * | 7/2015 | |
| JP | 5812704 B2 | | 11/2015 | |
| JP | 2016102831 A | * | 6/2016 | ....... G03G 15/04045 |

* cited by examiner

OPTICAL SCANNING DEVICE HAVING ROTATING POLYGON MIRROR, AND IMAGE FORMING APPARATUS INCLUDING THE SAME

BACKGROUND

Technical Field

One disclosed aspect of the embodiments relates to an optical scanning device that is installed in an image forming apparatus such as a printer and a copying machine, each of which has an electrophotographic recording system, and that deflects a laser light emitted from a light source with a rotating polygon mirror to perform scanning, and an image forming apparatus equipped with the optical scanning device.

Description of the Related Art

There is an optical scanning device where a rotating polygon mirror is arranged near an outer wall of an optical box to reduce the size of the optical scanning device (Japanese Patent No. 5812704).

The rotating polygon mirror rotates at high speed, and stirs air around the rotating polygon mirror. The stirred air collides with a wall arranged near the rotating polygon mirror, and generates noise. The frequency of the noise corresponds to the number of reflection surfaces of the rotating polygon mirror. In the case of four surfaces, sound with a frequency four times higher than a rotating frequency of the rotating polygon mirror is generated. The faster the rotating polygon mirror rotates, the greater a sound frequency and a sound pressure become. This causes an increase in noise as an output speed of the image forming apparatus increases. Further, the closer the rotating polygon mirror is arranged to the outer wall, the louder the sound becomes. This leads to an issue arising with the miniaturization of the optical scanning device.

SUMMARY

An aspect of the disclosure is directed to an optical scanning device that is small in size while suppressing noise.

According to an aspect of the disclosure, an optical scanning device that scans a surface of an object with a laser beam includes a deflection unit, a housing, and a cover. The deflection unit is configured to deflect the laser beam and includes a rotating polygon mirror that has a plurality of reflection surfaces to reflect the laser beam and a motor unit that rotates the rotating polygon mirror, which is mounted to the motor unit. The housing is where the deflection unit is mounted. The cover is configured to cover an opening of the housing. Among a plurality of outer walls of the housing surrounding an inner space of the housing and each having a surface parallel to a rotating shaft, an outer wall closest to a circumscribed circle of the rotating polygon mirror, which is centered on the rotating shaft, has a space in a position corresponding to a position of the plurality of reflection surfaces of the rotating polygon mirror in an axial direction of the rotating shaft. In a case where the optical scanning device is viewed in a direction perpendicular to the axial direction of the rotating shaft, a part of the cover is provided in a position farther from the circumscribed circle than the outer wall to close the space.

According to another aspect of the disclosure, an optical scanning device that scans a surface of an object with a laser beam includes a deflection unit, a housing, and a cover. The deflection unit is configured to deflect the laser beam and includes a rotating polygon mirror that has a plurality of reflection surfaces to reflect the laser beam and a motor unit that rotates the rotating polygon mirror, which is mounted to the motor unit. The housing is where the deflection unit is mounted. The cover covers an opening of the housing. In a case where the optical scanning device is viewed in a direction perpendicular to an axial direction, among a plurality of outer walls of the housing surrounding an inner space of the housing and each having a surface parallel to a rotating shaft, an outer wall closest to a circumscribed circle of the rotating polygon mirror, which is centered on the rotating shaft, and a part of the cover overlap each other in an axial direction of the rotating shaft. An overlapping region, where the outer wall and the part of the cover overlap each other, is not provided in a position corresponding to a position of the plurality of reflection surfaces of the rotating polygon mirror in the axial direction, but is provided only on a side opposite to a side, where a position for fixing the deflection unit to the housing is provided, with respect to the rotating polygon mirror in the axial direction. A part of the cover as the overlapping region is closer to the rotating polygon mirror than the outer wall.

Further features of the disclosure will become apparent from the following description of exemplary embodiments with reference to the attached drawings.

DESCRIPTION OF THE EMBODIMENTS

Image Forming Apparatus

Figure 11:
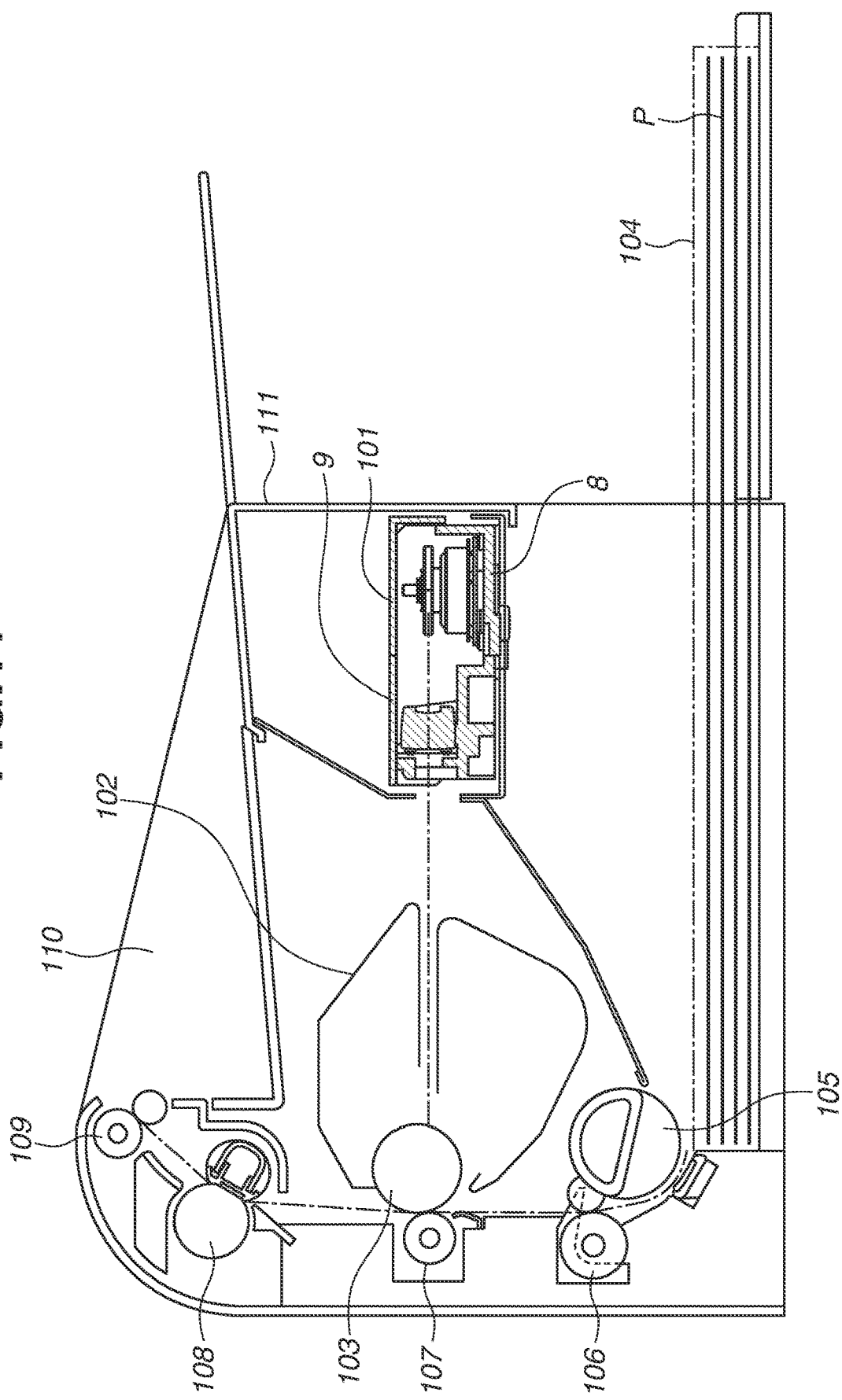
FIG. 11 is a cross-sectional view of an image forming apparatus according to the first exemplary embodiment.

FIG. 11 is a cross-sectional view of a laser beam printer. A printer 110 includes a scanner unit (optical scanning device) 101 that scans a photosensitive member 103 with a laser beam based on image information. When the photosensitive member 103 is scanned by the laser beam, an electrostatic latent image is formed on the photosensitive member (scanned surface) 103. The electrostatic latent image is developed by toner in a process cartridge 102. The process cartridge 102 integrally includes the photosensitive member 103 and a charging unit, a developing unit, and the like serving as a process unit that acts on the photosensitive member 103.

A recording medium P in a cassette 104 is fed while being separated by one sheet by a feeding roller 105. Then, the recording medium P is further conveyed to a downstream side by an intermediate roller 106. A toner image formed on the photosensitive member 103 is transferred onto the conveyed recording medium P by a transfer roller 107. The recording medium P having the unfixed toner image formed thereon is further conveyed to the downstream side. Then, the recording medium P is heated by a fixing device 108 having a heating element therein. By the heating, the toner image is fixed to the recording medium P. Then, the recording medium P is discharged to an outside of the printer 110 by a discharging roller 109.

An outer casing 111 of the printer 110 is arranged close to the outside of the scanner unit 101. The position of the outer casing 111 is determined by the position of the scanner unit 101.

Scanner Unit

Figure 1:
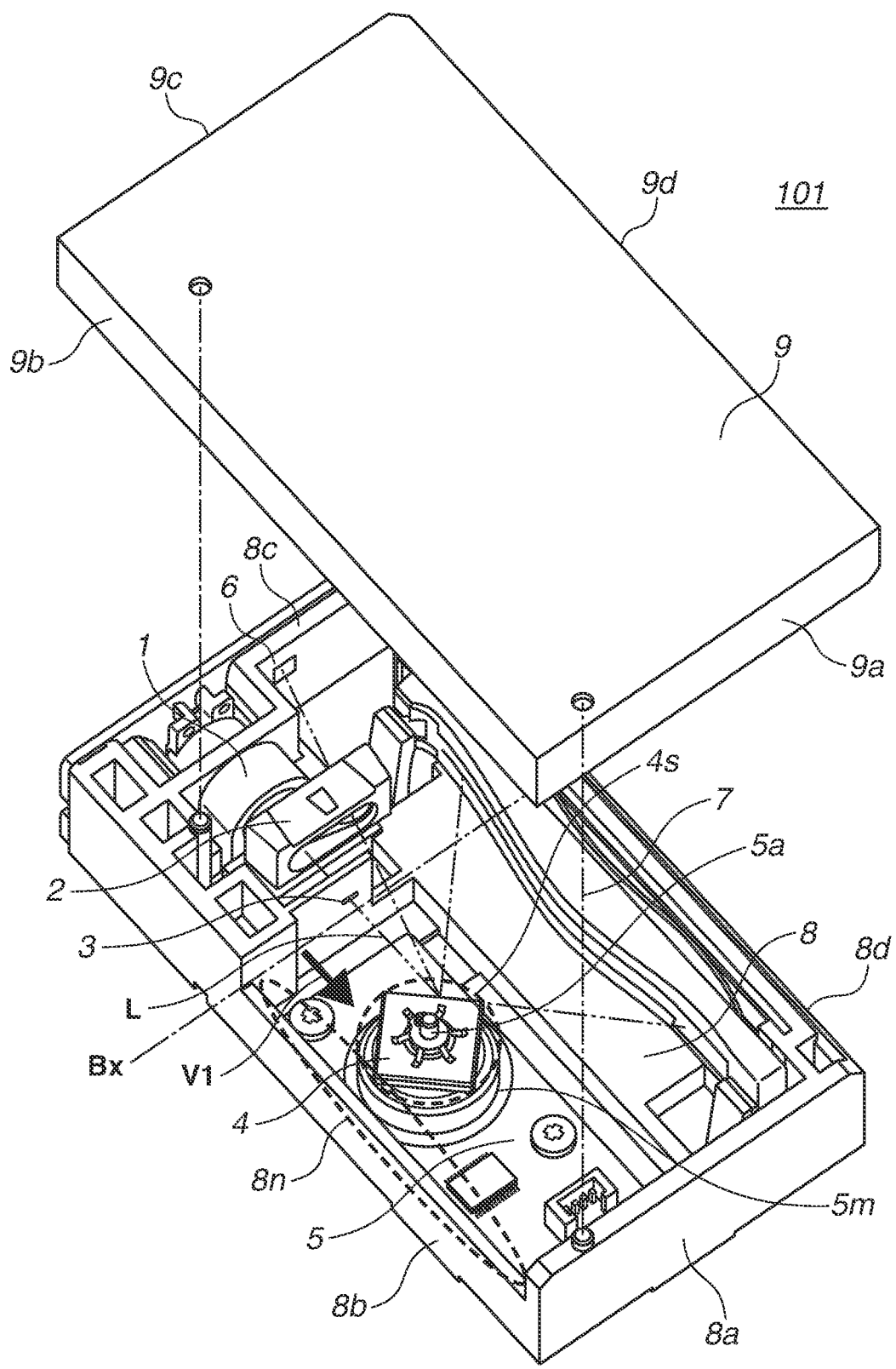
FIG. 1 is a perspective view of an optical scanning device according to a first exemplary embodiment.

FIG. 1 is a perspective view of the scanner unit 101 (shown in FIG. 11). A semiconductor laser unit 1 emits a laser beam. A composite anamorphic collimator lens where an anamorphic collimator lens and a synchronization signal detection lens are integrally molded. The anamorphic collimator lens is formed by integrating a collimator lens and a cylindrical lens. A reference numeral 3 denotes an aperture diaphragm. A rotating polygon mirror 4 has a plurality of reflection surfaces for reflecting the laser beam. A deflection unit 5 includes the rotating polygon mirror 4 and a motor unit 5m. The motor unit 5m rotates the rotating polygon mirror 4 that is mounted. The deflection unit 5 deflects the laser beam. A reference numeral 5a denotes a rotating shaft of the rotating polygon mirror 4. A reference numeral 6 denotes a synchronization signal detection sensor. A reference numeral 7 denotes an fθ lens (scanning lens). A reference numeral 8 denotes an optical box (housing) where the deflection unit 5 is fixed. A cover 9 covers an opening of the optical box 8. The cover 9 is arranged on the upper side of the optical box 8 in a vertical direction.

A laser beam L emitted from the semiconductor laser unit 1 becomes substantially parallel light or convergent light in a main scanning direction, and becomes convergent light in a sub scanning direction, by the composite anamorphic collimator lens 2. The laser beam L that has passed through the composite anamorphic collimator lens 2 is limited in a width of the light flux by passing through the aperture diaphragm 3, and forms an image on the reflection surface of the rotating polygon mirror 4. Then, the laser beam L is deflected for scanning by a rotation of the rotating polygon mirror 4, and is incident on a synchronization signal detection lens part of the composite anamorphic collimator lens 2. The laser beam L that has passed through the synchronization signal detection lens part is incident on the synchronization signal detection sensor 6. The synchronization signal detection sensor 6 generates a synchronization signal according to a timing of the laser beam incident on the synchronization signal detection sensor 6. A timing of the synchronization signal is assumed to be a writing timing in the main scanning direction. The laser beam L moving in the main scanning direction by the rotation of the rotating polygon mirror 4 is incident on the fθ lens 7. The laser beam L that has passed through the fθ lens 7 exits from an exit port of the optical box 8, and forms an image on the photosensitive member 103.

Figure 2:
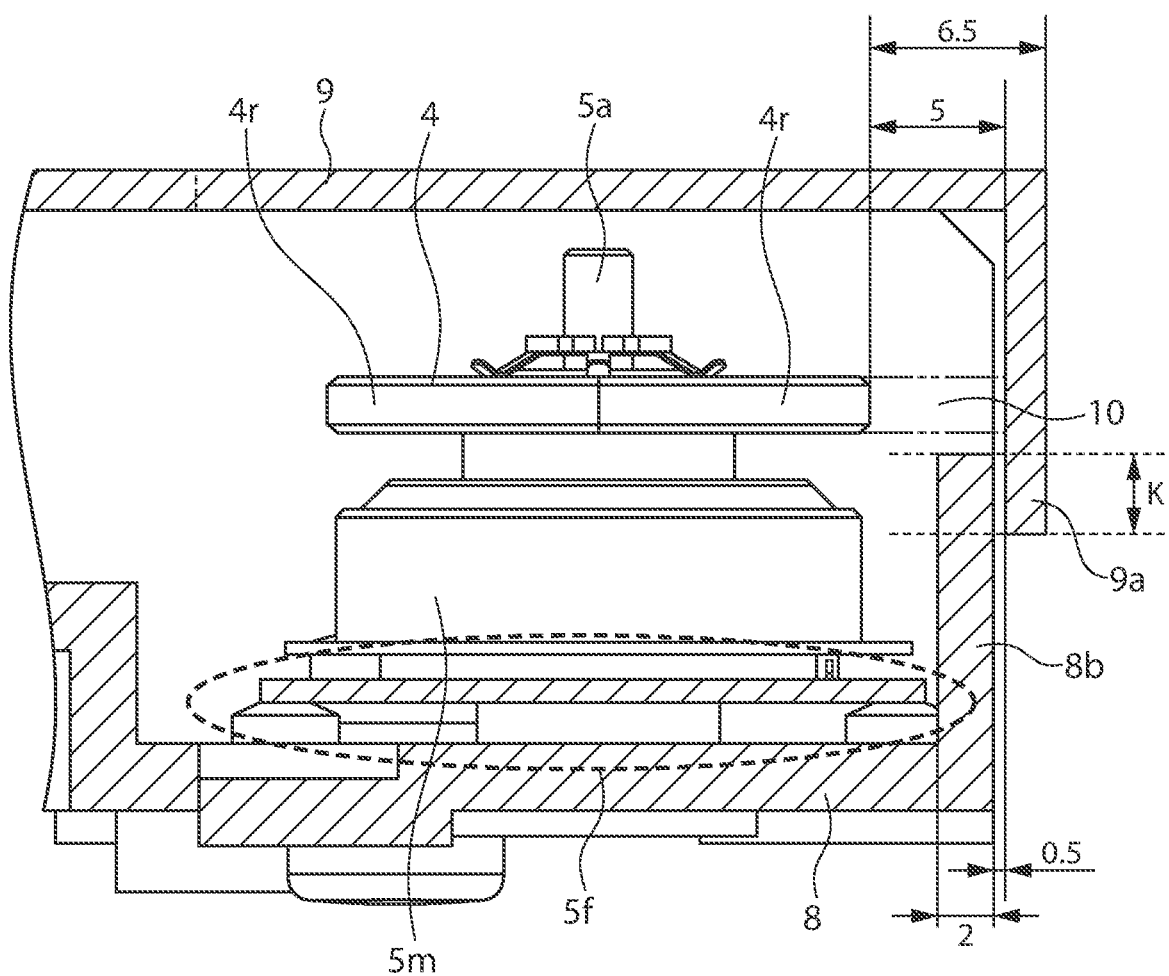
FIG. 2 is a partial cross-sectional view of the optical scanning device according to the first exemplary embodiment.

FIG. 2 is a diagram illustrating the scanner unit 101 (shown in FIG. 11), which is viewed from a line Bx in a direction of an arrow V1 (direction perpendicular to an axial direction of the rotating shaft 5a) illustrated in FIG. 1. As illustrated in FIGS. 1 and 2, the optical box 8 includes a plurality of outer walls 8a to 8d surrounding an inner space thereof. Reference signs 9a to 9d denote a plurality of outer walls of the cover 9, respectively.

As illustrated in FIG. 1, among the outer walls 8a to 8d of the optical box 8 that surround the inner space of the optical box 8 and are each parallel to the rotating shaft 5a, the outer wall 8b is the outer wall closest to a circumscribed circle 4s of the rotating polygon mirror 4 centered on the rotating shaft 5a. The circumscribed circle 4s is a circle connecting the four corners of the rotating polygon mirror 4.

A reference numeral 10 denotes a region between a plane including the bottom surface of the rotating polygon mirror 4 and a plane including the top surface of the rotating polygon mirror 4. The region 10 exists in a position facing a position of a reflection surface 4r of the rotating polygon mirror 4 in the axial direction of the rotating shaft 5a. At the position of the region 10, the outer wall 8b is not present but a space 8n. When the scanner unit 101 is viewed in the direction of the arrow V1 perpendicular to the axial direction of the rotating shaft 5a, a part of the cover 9 (the outer wall 9b of the cover) is provided in a position farther from the circumscribed circle 4s than the outer wall 8b so as to cover the space 8n. The optical box 8 and the cover 9 overlap each other by the outer wall 8a of the optical box 8 and the outer wall 9a of the cover 9 to ensure the dustproof performance. An overlapping region K is not provided in a position corresponding to the position of the reflection surface 4r of the rotating polygon mirror 4 in the axial direction of the rotating shaft 5a. The overlapping region K is provided only on a side where a fixing position 5f for the deflection unit 5 and the optical box 8 is provided with reference to the rotating polygon mirror 4 in the axial direction. With such a structure, the air stirred by the rotation of the rotating polygon mirror 4 is less likely to collide with the outer wall 8b closest to the circumscribed circle 4s of the rotating polygon mirror 4.

Figure 3:
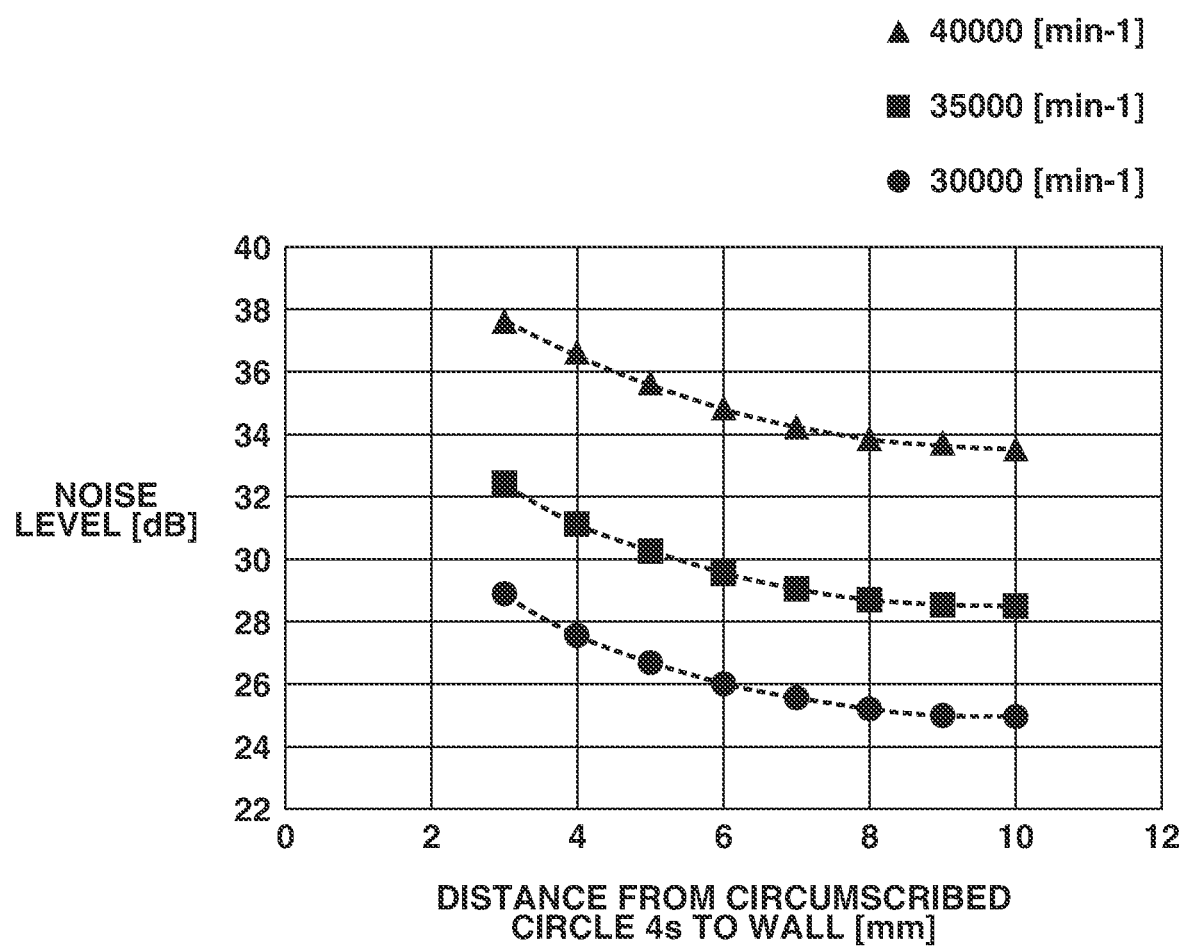
FIG. 3 is a graph illustrating experimental data of noise level.

FIG. 3 is a graph illustrating experimental data of noise generated when air stirred by the rotating polygon mirror 4 collides with a wall. A vertical axis represents a noise level [dB], and a horizontal axis represents a distance [mm] from the circumscribed circle 4s of the rotating polygon mirror 4 to the wall. The noise level is a sound pressure at a frequency obtained by multiplying a frequency of the rotation of the rotating polygon mirror 4 by the number of faces of the rotating polygon mirror 4 (four times). A diameter of the rotating polygon mirror 4 according to the present exemplary embodiment is 20 mm. According to the graph, it can be understood that the noise level decreases and it becomes quieter as the wall is separated from the rotating polygon mirror 4. The rotation number of the rotating polygon mirror 4 is 30,000 [min$^{-1}$], 35,000 [min$^{-1}$], and 40,000 [min$^{-1}$]. It can be understood that the noise level increases as the rotation number of the rotating polygon mirror 4 increases. Therefore, in order to reduce the noise increased by the multiplication by the number of faces of the rotating polygon mirror 4, it is preferable to separate the wall from the circumscribed circle 4s of the rotating polygon mirror 4 as much as possible. Further, in a case where the wall is close to the rotating polygon mirror 4, the noise level decreases by more than about 1 [dB] when the wall is separated by 1 mm. Therefore, the influence on the noise is large even when the difference in distance is about 1 mm.

Figure 4:
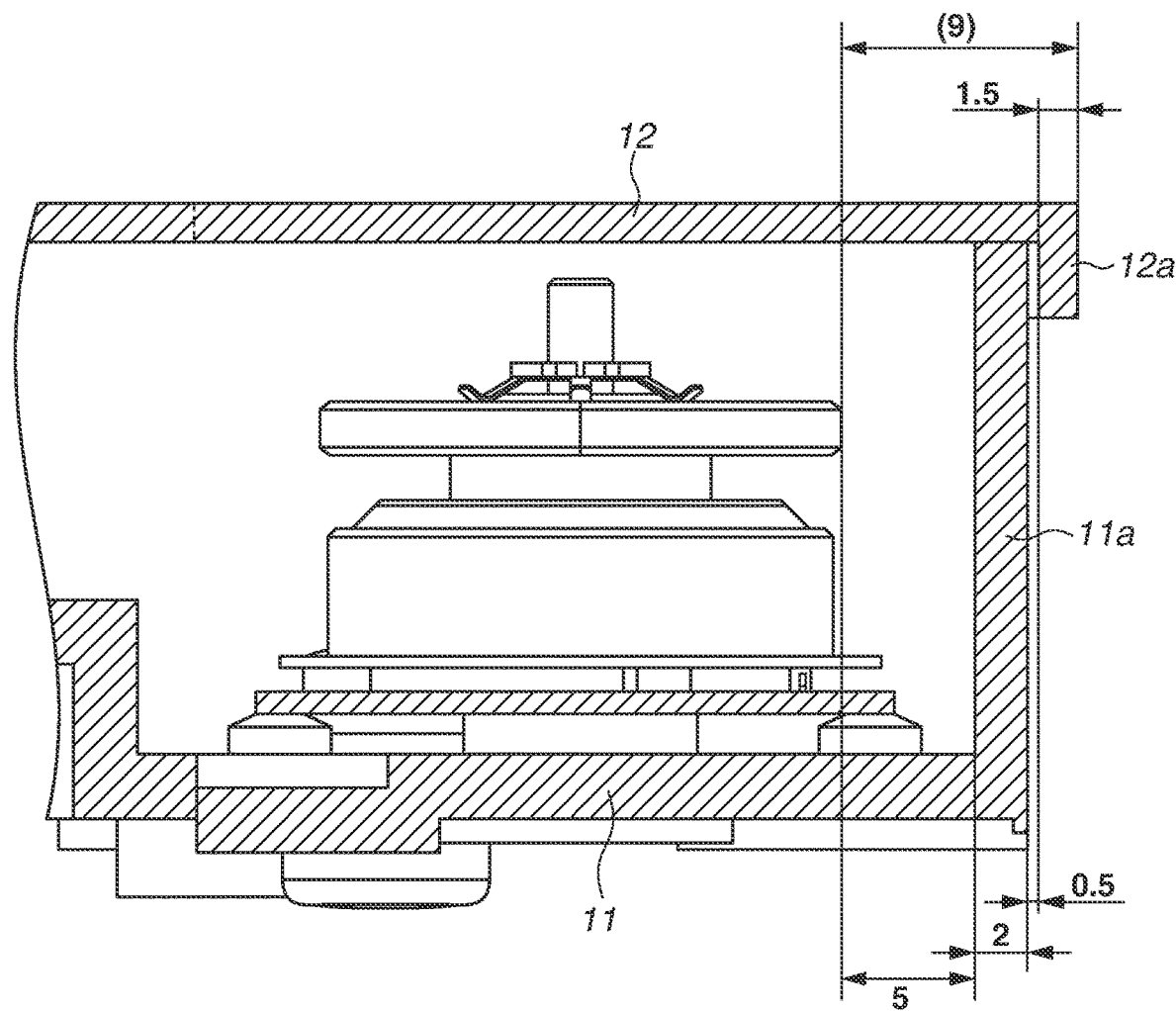
FIG. 4 is a partial sectional view of an optical scanning device according to a comparative example.

FIG. 4 is a cross-sectional view of a scanner unit according to a comparative example. A reference numeral 11 denotes an optical box. A reference numeral 11a denotes an outer wall of the optical box 11. A reference numeral 12 denotes a cover. A reference numeral 12a denotes an outer wall of the cover. The outer wall 11a is arranged in a position 5 mm away from the circumscribed circle 4s of the rotating polygon mirror 4. A thickness of the outer wall 11a is 2 mm. A gap between the outer wall 11a and the outer wall 12a is 0.5 mm. A thickness of the outer wall 12a is 1.5 mm. A distance from the circumscribed circle 4s of the rotating polygon mirror 4 to the outer surface of the outer wall 12a of the cover 12 is 9 mm. A distance of 5 mm between the circumscribed circle 4s and the outer wall 11a is a distance necessary for suppressing noise generated by the rotation of the rotating polygon mirror 4. If the outer wall 11a is closer to the rotating polygon mirror 4, the noise becomes louder.

On the basis of the above, as illustrated in FIG. 2, a height of the outer wall 8a is set lower than the position of the region 10 (that is, the structure, in which the outer wall 8a is not provided at the position corresponding to the rotating polygon mirror 4 in the axial direction of the rotating shaft 5a, is adopted), so as to prevent the noise from being generated by the collision of the air stirred by the rotating polygon mirror 4 with the outer wall 8a. As a result, it is possible to maintain the noise level, which is equivalent to the noise level of the comparative example, even when the outer wall 9a of the cover 9 is arranged in a position 5 mm away from the circumscribed circle 4s. In FIG. 2, a distance from the circumscribed circle 4s to the outer surface of the outer wall 9a of the cover 9 is 6.5 mm. Therefore, the outermost shape of the scanner unit 101 can be reduced by 2.5 mm as compared to the comparative example.

A particularly effective range against noise according to a configuration of the present exemplary embodiment will be described. As can be understood from FIG. 3, when the distance from the circumscribed circle 4s of the rotating polygon mirror 4 to the wall (outer wall 8a) becomes longer, the noise level becomes lower. Accordingly, as long as the distance exceeds a certain distance, the noise level does not change. That is, in a case where the distance between the circumscribed circle 4s of the rotating polygon mirror 4 and the outer wall 8a of the optical box 8 is within a predetermined range of distance, the noise level is high. Therefore, the effect on the noise is high when the configuration of the present exemplary embodiment is adopted.

The predetermined distance is calculated for each rotation number of the rotating polygon mirror 4 based on the experimental data illustrated in FIG. 3. When the data with the rotation number of 40,000 [min$^{-1}$] is approximated by a quadratic curve, the following equation 1 is obtained.

$$y=0.08958x^2-1.742x+41.95 \quad \text{(Equation 1)}$$

Here, y represents the noise level [dB], and x represents the distance [mm] between the circumscribed circle 4s of the rotating polygon mirror and the wall.

Similarly, when the data with the rotation number of 35,000 [min$^{-1}$] and 30,000 [min$^{-1}$] are approximated by a quadratic curve, the following equations 2 and 3 are obtained.

$$y=0.09095x^2-1.712x+36.50 \quad \text{(Equation 2)}$$

$$y=0.09345x^2-1.736x+33.05 \quad \text{(Equation 3)}$$

The distance from the circumscribed circle 4s to the wall, where the noise level does not change, is determined. Each of the equation 1, the equation 2, and the equation 3 is differentiated by x to obtain x at which the slope of the quadratic curve becomes zero. As a result, x at 40,000 [min$^{-1}$] is about 9.72 mm, x at 35,000 [min$^{-1}$] is about 9.41 mm, and x at 30,000 [min$^{-1}$] is about 9.29 mm. The distance between the circumscribed circle 4s and the wall, where the noise level does not change, becomes longer, as the rotation number of the rotating polygon mirror 4 becomes higher. Accordingly, it can be understood that there is the relationship between the rotation number and the distance between the circumscribed circle 4s and the wall.

Figure 5:
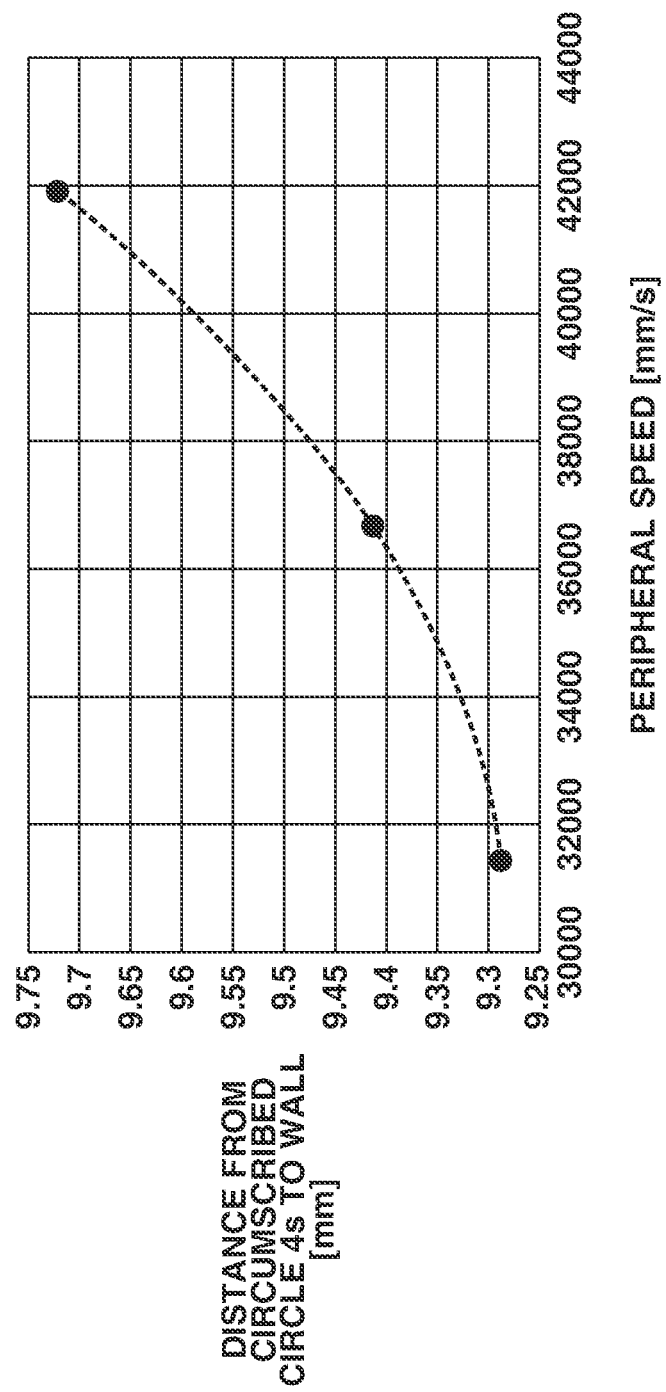
FIG. 5 is a graph illustrating a relationship between the number of rotations and a distance at which a noise level does not change.

In order to generalize the relationship between the rotation number and the distance where the noise level does not change, the rotation number is replaced with a peripheral speed on the circumscribed circle 4s, and a relationship between the peripheral speed and the distance is plotted. FIG. 5 is a graph illustrating the relationship. A vertical axis represents a distance d [mm] from the circumscribed circle 4s to the wall, and a horizontal axis represents a peripheral speed v [mm/s] on the circumscribed circle 4s. When the relationship is approximated by a quadratic curve, the following equation 4 is obtained.

$$d=3.342\times10^{-9}v^2-2.036\times10^{-4}v+12.39 \quad \text{(Equation 4)}$$

Here, d represents the distance [mm] between the circumscribed circle 4s and the wall, and v represents the peripheral speed [mm/s] at the position of the circumscribed circle 4s. Accordingly, the approximate range that has a large influence on the noise can be a range where the following inequality 5 is satisfied.

$$d\leq3.342\times10^{-9}v^2-2.036\times10^{-4}v+12.39 \quad \text{(Inequality 5)}$$

As described above, according to the present exemplary embodiment, it is possible to provide an optical scanning device that is small in size but suppresses noise. Although the case where the rotating polygon mirror 4 has four faces is described in the present exemplary embodiment, the same effect can be obtained even when the rotating polygon mirror 4 has five, six or other faces.

A scanner unit (optical scanning device) according to a second exemplary embodiment will be described with reference to FIGS. 6 and 7. Components similar to the components in the first exemplary embodiment described above are denoted by the same reference signs, and the description thereof will be omitted.

Figure 6:
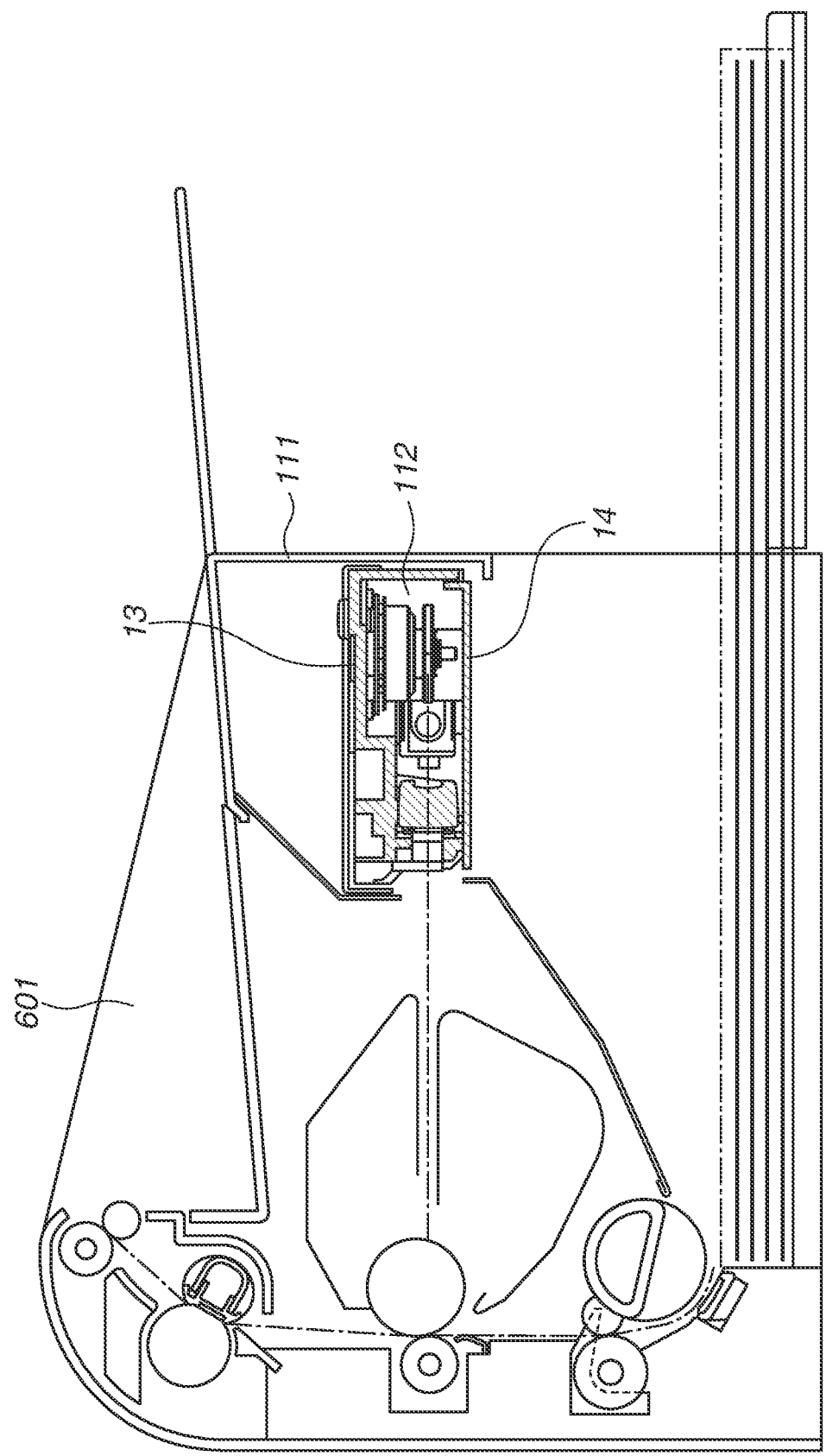
FIG. 6 is a cross-sectional view of an image forming apparatus according to a second exemplary embodiment.

FIG. 6 is a cross-sectional view of a printer according to the second exemplary embodiment. The second exemplary embodiment differs from the first exemplary embodiment in that, in a printer 601, a cover 14 is arranged below an optical box (housing) 13 in the vertical direction, and an outer wall of the optical box 13 is arranged farther from the circumscribed circle than the outer wall of the cover 14. FIG. 7 is a partial cross-sectional view of a scanner unit 112 illustrating a portion similar to the portion as illustrated in FIG. 2. The reference numeral 13 denotes the optical box, the reference numeral 13a denotes the outer wall of the optical box 13, the reference numeral 14 denotes the cover, and the reference numeral 14a denotes an outer wall of the cover 14. The reference numeral 15 denotes a region formed between a plane including the top surface of the rotating polygon mirror 4 and a plane including the bottom surface of the rotating polygon mirror 4. The deflection unit 5 is fixed to the optical box 13. The cover 14 is arranged below the optical box 13 in the vertical direction.

Figure 7:
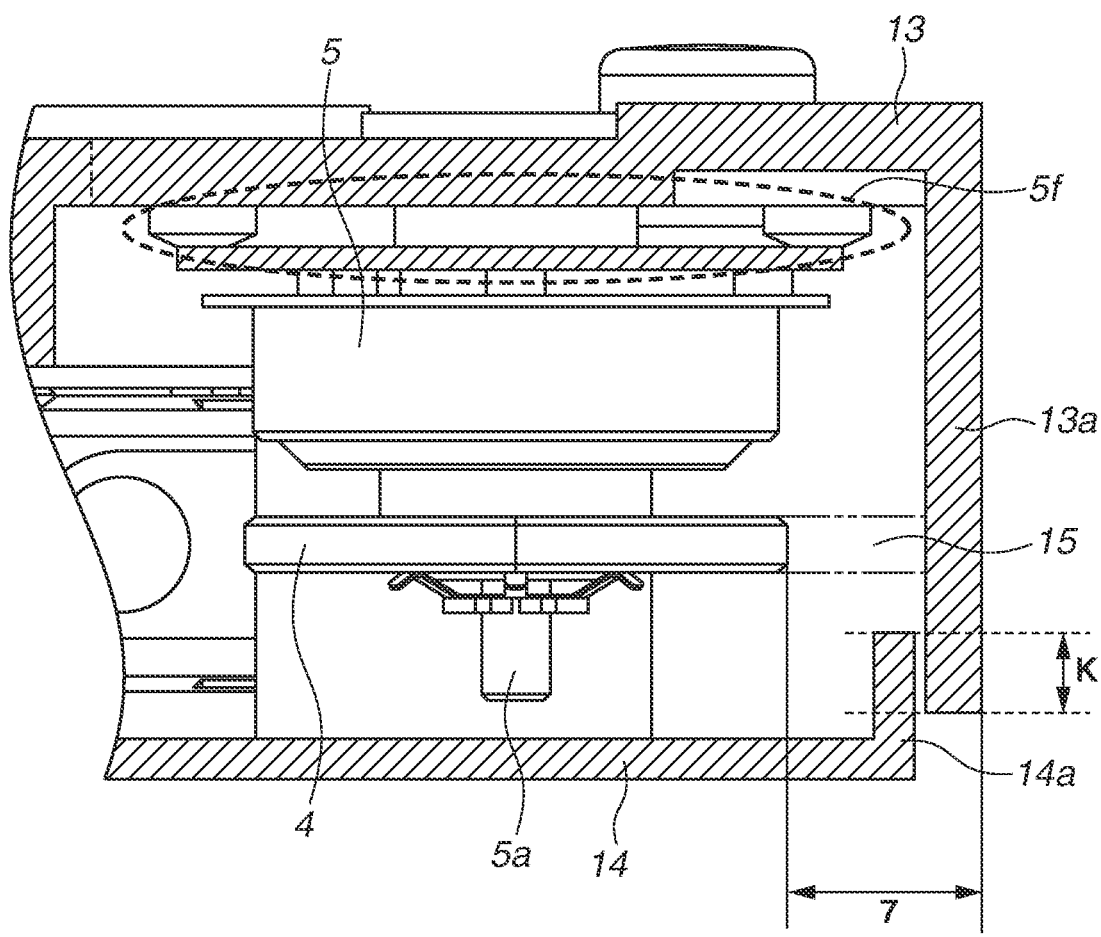
FIG. 7 is a partial cross-sectional view of an optical scanning device according to the second exemplary embodiment.

With such a configuration, in order to ensure the dustproof performance of the scanner unit 112, the outer wall 13a of the optical box 13 is arranged outside the outer wall 14a of the cover 14, as illustrated in FIG. 7. That is, in a direction perpendicular to the axial direction of the rotating shaft 5a, the outer wall 14a of the cover 14 is arranged in a position closer to the rotating polygon mirror than the outer wall 13a of the optical box 13. The outer wall 14a of the cover 14 is not arranged in the region 15, and the outer wall 13a of the optical box 13 closes a space of the region 15.

As described above, when the scanner unit is viewed in the direction perpendicular to the axial direction of the rotating shaft 5a, the outer wall 13a closest to the circumscribed circle of the rotating polygon mirror 4 centered on the rotating shaft 5a overlaps the outer wall 14a, which is a part of the cover 14, in the axial direction of the rotating shaft 5a. An overlapping region K is not arranged in a position corresponding to the position of the reflection surface 4r of the rotating polygon mirror 4 in the axial direction. The overlapping region K is provided only on a side opposite to a side, where the fixing position 5f for the deflection unit 5 and the optical box 13 is provided, with respect to the rotating polygon mirror 4 in the axial direction. Further, the outer wall 14a as a portion of the cover 14 that is in the overlapping region K is provided closer to the rotating polygon mirror 4 than the outer wall 13a.

The present exemplary embodiment can also provide an optical scanning device that is small in size but suppresses noise.

A scanner unit (optical scanning device) according to a third exemplary embodiment will be described with reference to FIGS. 8, 9A, and 9B. Note that components similar to the components in the first and second exemplary embodiments described above are denoted by the same reference signs, and the description thereof will be omitted.

Figure 8:
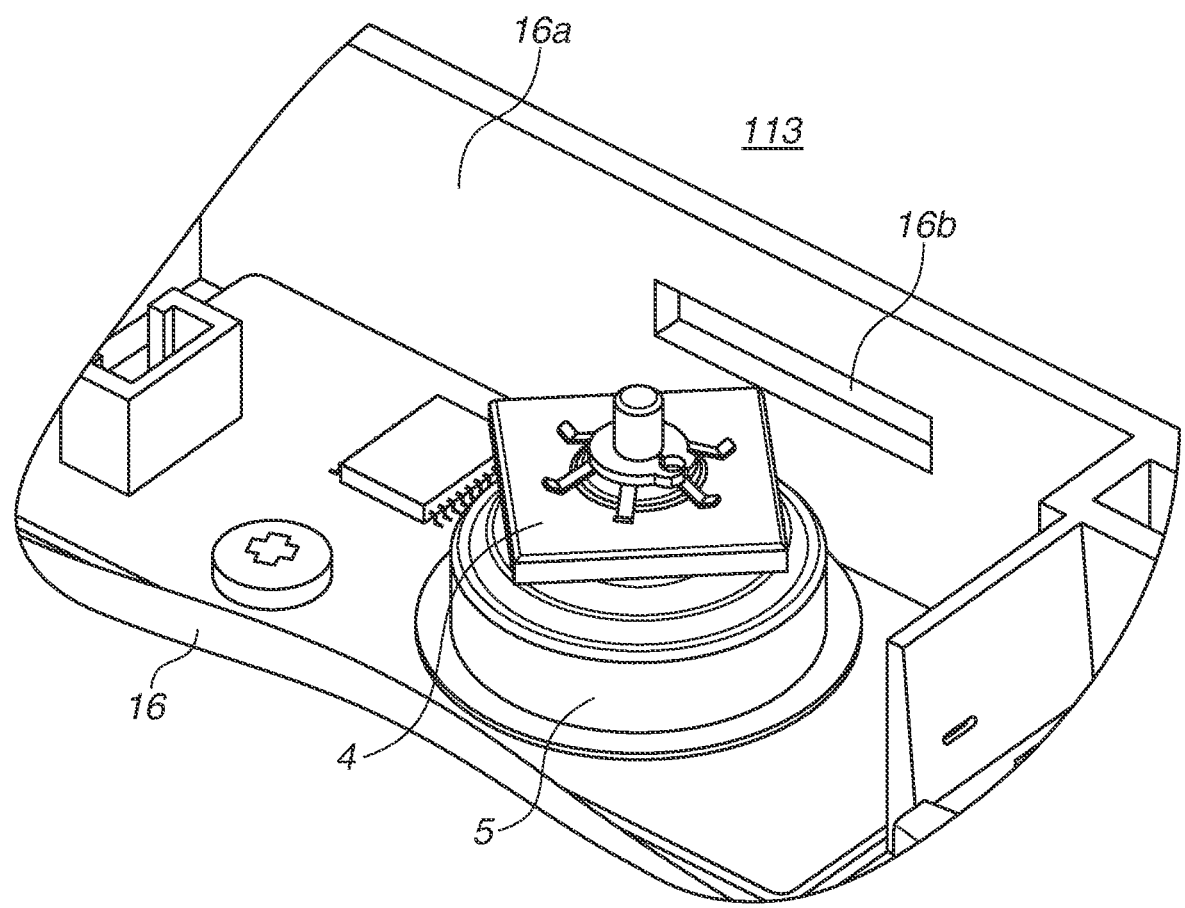
FIG. 8 is a partial perspective view of an optical scanning device according to a third exemplary embodiment.

FIG. 8 is a partial perspective view of the vicinity of the deflection unit 5 of a scanner unit 113. The reference numeral 16 denotes an optical box, the reference numeral 16a denotes an outer wall of the optical box 16, and the reference numeral 16b denotes a hole of the optical box 16.

Figure 9A:
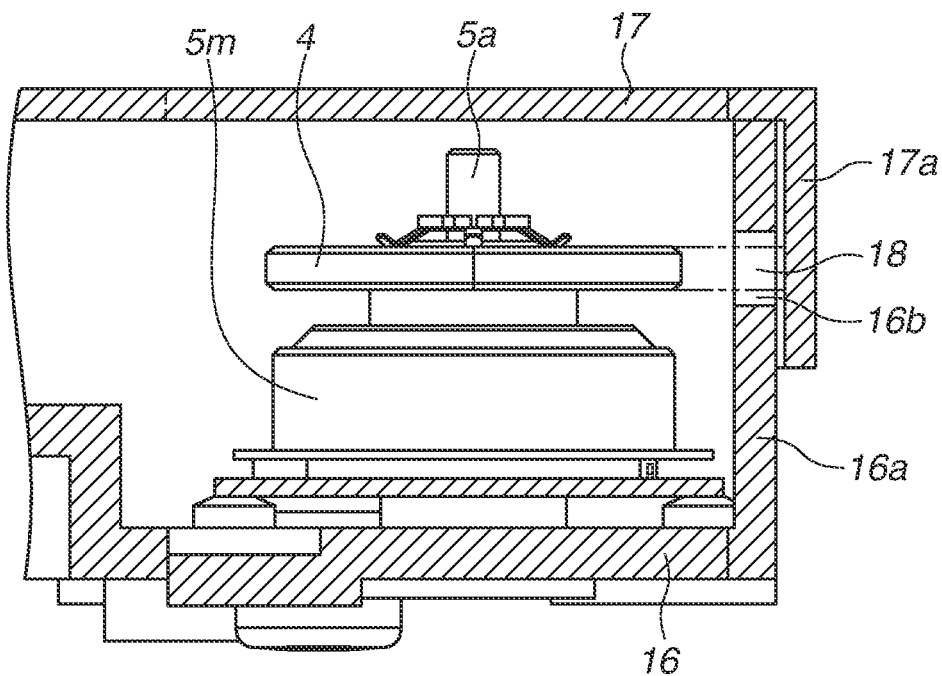
FIGS. 9A and 9B are partial cross-sectional views of the optical scanning device according to the third exemplary embodiment.
Figure 9B:
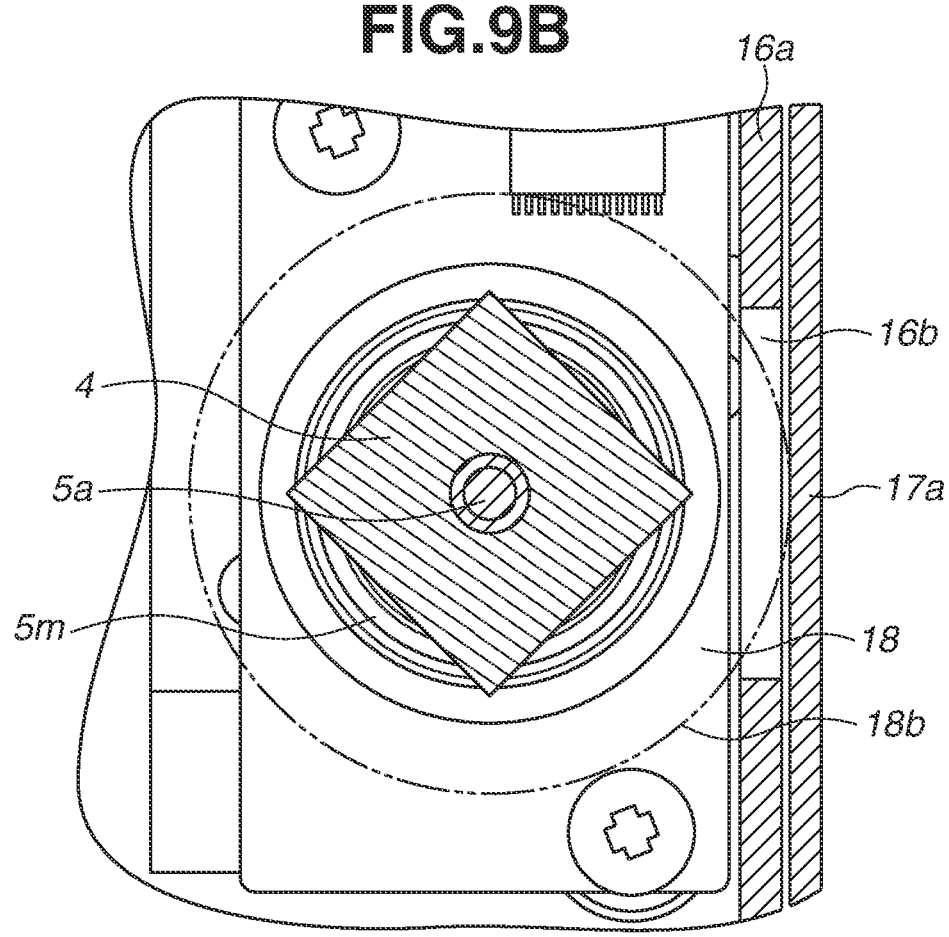

FIGS. 9A and 9B are partial cross-sectional views of the scanner unit 113. The reference numeral 18 denotes a region formed between a plane including the top surface of the rotating polygon mirror 4 and a plane including the bottom surface of the rotating polygon mirror 4. The region 18 is a cylindrical region with a distance from the rotating shaft 5a as the center to an inner surface of an outer wall 17a of a cover 17 being defined as the radius. The reference numeral 18b denotes a boundary line of the region 18. The outer wall 16a of the optical box 16 is not provided in the region 18, and the hole 16b is provided in the region 18. The hole 16b is covered by the outer wall 17a of the cover 17 to secure the dustproof performance of the scanner unit 113. Also in the present exemplary embodiment, in the outer wall 16a closest to the circumscribed circle of the rotating polygon mirror 4, a space (hole 16b) is provided in a position facing the position of the reflection surface 4r of the rotating polygon mirror 4 in the axial direction of the rotating shaft 5a. Further, when the scanner unit 113 is viewed in the direction perpendicular to the axial direction of the rotating shaft 5a, the outer wall 17a, which is a part of the cover 17, is provided in a position farther from the circumscribed circle than the outer wall 16a so as to close the space (hole 16b).

With this configuration, a portion where the air stirred by the rotating polygon mirror 4 collides most vigorously is the outer wall 17a of the cover 17, so that the noise mainly occurs between the air stirred by the rotating polygon mirror 4 and the outer wall 17a of the cover 17. However, since the outer wall 17a of the cover 17 is sufficiently spaced apart from the rotating polygon mirror 4, the noise level can be suppressed to a low level.

Figure 10A:
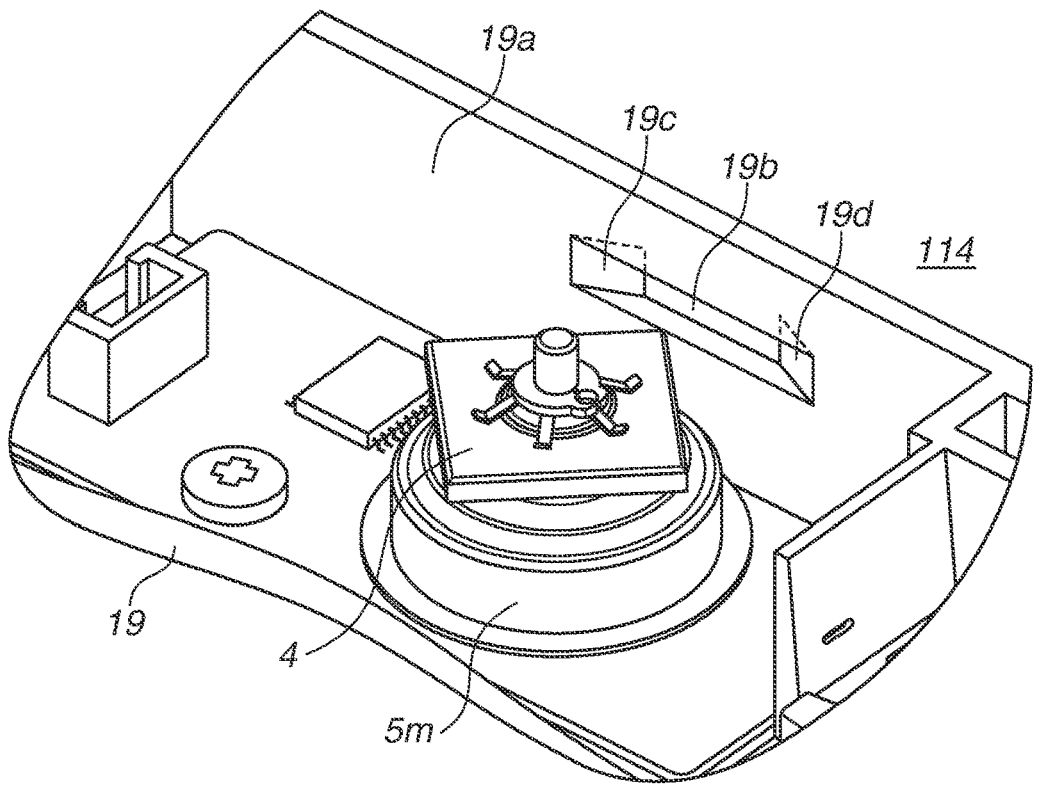
FIGS. 10A and 10B are partial perspective and cross-sectional views of a modified example of the third exemplary embodiment, respectively.
Figure 10B:
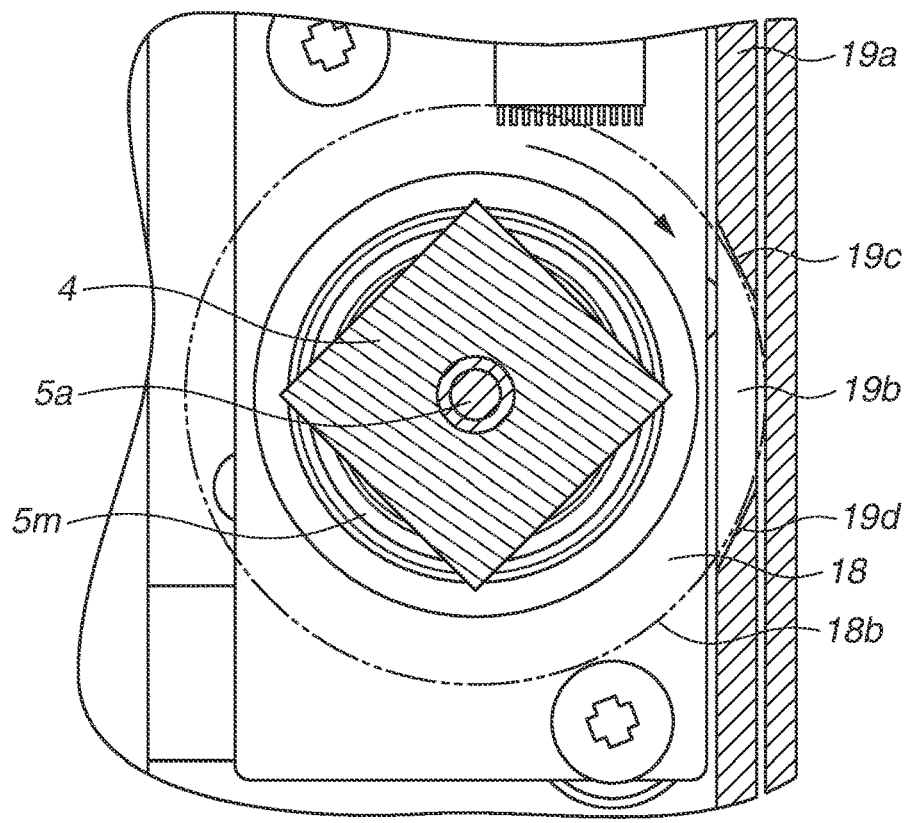

FIGS. 10A and 10B illustrate a modified example of the third exemplary embodiment. In FIGS. 10A and 10B, an outer wall 19a of an optical box 19 is not present in the region 18, and a hole 19b is provided in the region 18. The hole 19b is covered by the outer wall 17a of the cover 17 to ensure the dustproof performance of a scanner unit (optical scanning device) 114. Inclined surfaces 19c and 19d are formed in a position corresponding to the hole 19b of the outer wall 19a. That is, the inclined surfaces 19c and 19d are provided in a portion around the hole 19b of the optical box 19, which is an outer wall having the hole 19b, along a rotation direction of the rotating polygon mirror 4. With this configuration, when the rotating polygon mirror 4 rotates in a direction of an arrow illustrated in FIG. 10B, the air stirred by the rotating polygon mirror 4 is stirred without accumulating in the hole 19b as much as possible.

As a result, it is possible to suppress the turbulence of air in the vicinity of the rotating polygon mirror 4, and to reduce rotational unevenness of the rotating polygon mirror 4 due to an air resistance as much as possible. The other effects are the same as those in the third exemplary embodiment.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-166871, filed Sep. 13, 2019, which is hereby incorporated by reference herein in its entirety.

What is claimed is:

1. An optical scanning device that scans a surface of an object with a laser beam, the optical scanning device comprising:
    a deflection unit configured to deflect the laser beam, the deflection unit including a rotating polygon mirror having a plurality of reflection surfaces to reflect the laser beam and a motor unit mounted with the rotating polygon mirror and rotating the rotating polygon mirror;
    a housing where the deflection unit is mounted, the housing includes a plurality of walls surrounding an inner space of the housing and each having a surface parallel to a rotation axis of the motor unit; and
    a cover configured to cover an opening of the housing,
    wherein, as seen in a direction of the rotation axis, the plurality of walls includes a wall closest to a circumscribed circle about the rotation axis,
    wherein a space is provided in a part of the wall closest to the circumscribed circle of the rotating polygon mirror at a position corresponding to a position of the plurality of reflection surfaces of the rotating polygon mirror in a direction of the rotation axis, and
    wherein, as seen in a direction perpendicular to the direction of the rotation axis, a part of the cover is provided so as to close the space.

2. The optical scanning device according to claim 1, wherein the optical scanning device satisfies an inequality:

$$d \leq 3.342 \times 10^{-9} v^2 - 2.036 \times 10^{-4} v + 12.39,$$

where d is a distance [mm] from the circumscribed circle to the wall closest to the circumscribed circle, and v is a peripheral speed [mm/s] of the rotating polygon mirror on the circumscribed circle.

3. The optical scanning device according to claim 1, wherein the space is a hole formed in the wall closest to the circumscribed circle about the rotation axis.

4. The optical scanning device according to claim 3, wherein an inclined surface along a rotation direction of the rotating polygon mirror is provided around the hole.

5. The optical scanning device to claim 1, wherein the space is a notch formed in the wall closest to the circumscribed circle.

6. The optical scanning device to claim 1, wherein the plurality of walls includes another wall including an area through which the laser beam passes, and the wall closest to the circumscribed circle is different from the another wall.

7. An image forming apparatus that forms an image based on image information on a recording medium, the image forming apparatus comprising:
    a photosensitive member; and
    an optical scanning device configured to scan the photosensitive member with a laser beam based on the image information,
    wherein the optical scanning device includes:
        a deflection unit configured to deflect the laser beam, the deflection unit including a rotating polygon mirror having a plurality of reflection surfaces to reflect the laser beam and a motor unit mounted with the rotating polygon mirror and rotating the rotating polygon mirror;
        a housing where the deflection unit is mounted, the housing includes a plurality of walls surrounding an inner space of the housing and each having a surface parallel to a rotation axis of the motor unit; and
        a cover configured to cover an opening of the housing,
    wherein, as seen in a direction of the rotation axis, the plurality of walls includes a wall closest to a circumscribed circle about the rotation axis,
    wherein a space is provided in a part of the wall closest to the circumscribed circle of the rotating polygon mirror at a position corresponding to a position of the plurality of reflection surfaces of the rotating polygon mirror in a direction of the rotation axis, and
    wherein, as seen in a direction perpendicular to the direction of the rotation axis, a part of the cover is provided so as to close the space.

8. The image forming apparatus according to claim 7, wherein the cover is arranged on an upper side of the housing in a vertical direction.

9. An optical scanning device that scans a surface of an object with a laser beam, the optical scanning device comprising:
    a deflection unit configured to deflect the laser beam, the deflection unit including a rotating polygon mirror having a plurality of reflection surfaces to reflect the laser beam and a motor unit mounted with the rotating polygon mirror and rotating the rotating polygon mirror;
    a housing where the deflection unit is mounted, the housing includes a plurality of walls surrounding an inner space of the housing and each having a surface parallel to a rotation axis of the motor unit; and
    a cover configured to cover an opening of the housing,
    wherein, as seen in a direction of the rotation axis, the plurality of walls includes a wall closest to a circumscribed circle about the rotation axis,
    wherein, as seen in a direction perpendicular to the direction of the rotation axis, the wall closest to the circumscribed circle and a part of the cover overlap each other in the direction of the rotation axis,
    wherein, as seen in the direction perpendicular to the direction of the rotation axis, an overlapping region, where the wall closest to the circumscribed circle and the part of the cover overlap each other, is not provided in a position corresponding to a position of the plurality of reflection surfaces of the rotating polygon mirror in the direction of the rotation axis, but is provided only on a side opposite to a side, where a fixing position for the deflection unit and the housing is provided, with respect to the rotating polygon mirror in the direction of the rotation axis, and
    wherein, as seen in the direction perpendicular to the direction of the rotation axis, the part of the cover as the overlapping region is closer to the rotating polygon mirror than the wall closest to the circumscribed circle with respect to the direction perpendicular to the direction of the rotation axis.

10. The optical scanning device according to claim 9, wherein the optical scanning device satisfies an inequality:

$$d \leq 3.342 \times 10^{-9} v^2 - 2.036 \times 10^{-4} v + 12.39,$$

where d is a distance [mm] from the circumscribed circle to the wall closest to the circumscribed circle, and v is a peripheral speed [mm/s] of the rotating polygon mirror on the circumscribed circle.

11. The optical scanning device to claim 9, wherein the plurality of walls includes another wall including an area through which the laser beam passes, and the wall closest to the circumscribed circle is different from the another wall.

12. An image forming apparatus that forms an image based on image information on a recording medium, the image forming apparatus comprising:
    a photosensitive member; and
    an optical scanning device configured to scan the photosensitive member with a laser beam according to the image information,
    wherein the optical scanning device includes:
        a deflection unit configured to deflect the laser beam, the deflection unit including a rotating polygon mirror having a plurality of reflection surfaces to reflect the laser beam and a motor unit mounted with the rotating polygon mirror and rotating the rotating polygon mirror;
        a housing where the deflection unit is mounted, the housing includes a plurality of walls surrounding an inner space of the housing and each having a surface parallel to a rotation axis of the motor unit; and
        a cover configured to cover an opening of the housing,
    wherein, as seen in a direction of the rotation axis, the plurality of walls includes a wall closest to a circumscribed circle about the rotation axis,
    wherein, as seen in a direction perpendicular to the direction of the rotation axis, the wall closest to the circumscribed circle and a part of the cover overlap each other in the direction of the rotation axis,
    wherein, as seen in the direction perpendicular to the direction of the rotation axis, an overlapping region, where the wall closest to the circumscribed circle and the part of the cover overlap each other, is not provided in a position corresponding to a position of the plurality of reflection surfaces of the rotating polygon mirror in the direction of the rotation axis, but is provided only on a side opposite to a side, where a fixing position for fixing the deflection unit to the housing is provided, with respect to the rotating polygon mirror in the direction of the rotation axis, and wherein, as seen in the direction perpendicular to the direction of the rotation axis, the part of the cover as the overlapping region is closer to the rotating polygon mirror than the wall closest to the circumscribed circle with respect to the direction perpendicular to the direction of the rotation axis.

13. The image forming apparatus according to claim 12, wherein the cover is arranged on a lower side of the housing in a vertical direction.

* * * * *